Feb. 16, 1960  P. H. HARRER  2,924,982
REVERSIBLE BELT DRIVE
Filed Feb. 24, 1958
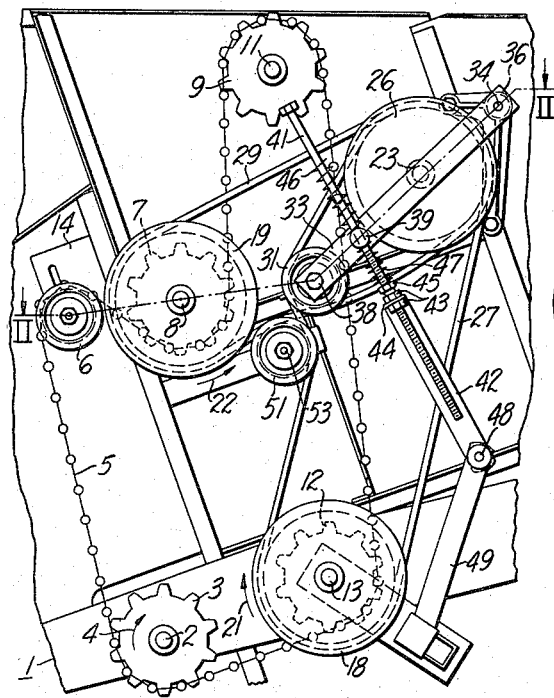
Fig. 1
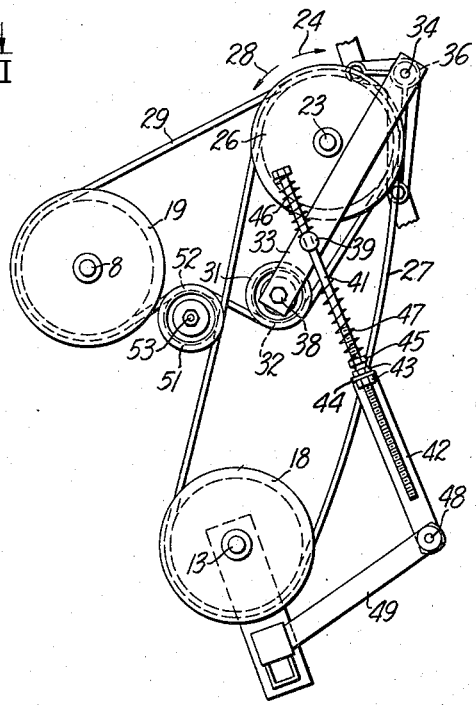
Fig. 3
Fig. 2
Inventor
Paul H. Harrer
by
Attorney

United States Patent Office 2,924,982
Patented Feb. 16, 1960

2,924,982

REVERSIBLE BELT DRIVE

Paul H. Harrer, La Porte, Ind., assignor to Allis-Chalmers Manufacturing Company, Milwaukee, Wis.

Application February 24, 1958, Serial No. 717,129

3 Claims. (Cl. 74—220)

The invention relates to power transmitting mechanisms, and it is concerned more particularly with a reversible belt drive.

Reversible belt drives have heretofore been known for transmitting power from a unidirectionally rotatable driving shaft to a reversibly rotatable driven shaft. In such prior art drives a pair of coaxial sheaves and two individual sheaves have been rotatably mounted on triangularly spaced axes, and two endless belts have been used, one looped loosely around one of said coaxial and one of said individual sheaves, and the other looped loosely around the other of said coaxial and individual sheaves. In order to establish a power transmitting connection between the sheaves around which one of the belts is looped the belt is tightened while the other belt remains loose. Conversely, leaving the one belt loose and tightening the other will establish a power transmitting connection between the sheaves around which the other belt is looped.

The mentioned alternate tightening of the belts presents a problem because manufacturing variations of the belts, their elasticity and wear must be taken care of so as to avoid slippage of the belts, loss of power and other difficulties.

Generally, it is an object of the invention to provide a reversible belt drive of the hereinbefore outlined character incorporating an improved mechanism for alternately tightening the belts.

More specifically, it is an object of the invention to provide an improved mechanism for alternately tightening the belts of a reversible belt drive, which will operate efficiently regardless of manufacturing variations and stretch of the belts and which will not require unduly frequent adjustment to compensate for normal wear of the belts.

Another object of the invention is to provide an improved belt tightening mechanism for the hereinbefore outlined character which requires relatively few parts and which lends itself to manufacture at relatively low costs.

These and other objects and advantages are attained by the present invention, various novel features of which will be apparent from the description herein and the accompanying drawing disclosing an embodiment of the invention, and will be more particularly pointed out in the appended claims.

In the drawing:

Fig. 1 is a side elevation of a reversible belt drive;

Fig. 2 is a sectional view on line II—II of Fig. 1; and

Fig. 3 is a schematic view generally similar to Fig. 1 but showing the mechanism in a different condition of adjustment.

Referring to Fig. 1, a frame structure, generally designated by the reference character 1, affords a support for a power input shaft 2 which is rotatably mounted on the frame 1 in conventional manner, for instance by means of a pair of axially spaced bearings (not shown), so that the shaft 2 will have an axis of rotation in fixed relation to the frame 1. Rigidly secured to the shaft 2 for rotation in unison therewith is a chain sprocket wheel 3, and a conventional power train (not shown) may be connected to the shaft 2 for rotating it and the sprocket wheel 3 continuously in the direction of arrow 4.

An endless chain 5 runs from the sprocket wheel 3 over an idler 6 and under a sprocket wheel 7 on a shaft 8, then over an auxiliary sprocket wheel 9 on a shaft 11, then around a sprocket wheel 12 on a shaft 13 and then back to the sprocket wheel 3. Each of the shafts 8, 11 and 13 is conventionally mounted, like the shaft 2, for rotation on an axis in fixed relation to the frame 1, and the idler 6 is rotatably mounted on a stationary bracket 14 by means of a bolt 16 and a ball bearing 17 (Fig. 2), the bracket 14 being rigidly secured to the frame 1. The chain 5 represents a flexible power transmitting element which has an inner side in cooperative engagement with the sprocket wheels 3, 9 and 12, and an outer side in cooperative engagement with the sprocket wheel 7.

In addition to the chain sprocket 12, a single groove V-belt pulley 18 is secured to the shaft 13 for rotation in unison with the latter. Another single groove V-belt pulley 19 is secured to the shaft 8 for rotation in unison with the chain sprocket 7. When the chain sprocket 3 is rotated in clockwise direction as indicated by arrow 4, the shaft 13 and associated belt pulley 18 are also driven in clockwise direction as indicated by the arrow 21. At the same time the shaft 8 together with the sprocket wheel 7 and the V-belt pulley 19 are driven in anti-clockwise direction as indicated by arrow 22.

A power output or driven shaft 23 is rotatably mounted on the frame structure 1 in conventional manner at fixed radial distances from the shafts 8 and 13, respectively. Fixedly secured to the shaft 23 for rotation in unison therewith is a driven pulley 26 which has V-grooves 20 and 25 at the axially outer and axially inner sides, respectively, of its radial center plane.

A forward drive train for rotating the shaft 23 in clockwise direction as indicated by the arrow 24 includes an endless V-belt 27 which is trained about and adapted to ride in a slack condition on the pulley 18 and on the section of the double groove pulley 26 presenting the groove 20.

A reverse drive train for rotating the shaft 23 in anticlockwise direction, as indicated by the arrow 28, includes another endless V-belt 29 which is trained about and adapted to ride in a slack condition on the V-belt pulley 19 and on the section of the double V-groove pulley 26 presenting the groove 25.

The section of the double grooved pulley 26 which contains the V-groove 20 forms, in effect, a driven pulley of the forward drive train, and the section of the pulley 26 which contains the V-groove 25 forms, in effect, a driven pulley of the reverse drive train which is connected with the driven pulley of the forward drive train for rotation in unison therewith.

The chain drive 5 and associated sprocket wheels 3, 7, 9 and 12 represent means for rotating the driving pulleys 18 and 19 of the forward and reverse drive trains simultaneously in opposite directions.

Control means for alternately tightening the belts 27 and 29 include two coaxial idler wheels 31 and 32 (Fig. 2) which are rotatably mounted on the free end of an arm 33 for swinging movement in unison with the latter about the axis of a pivot pin 34. The arm 33 is made of square tubing and is rigidly secured to the pivot pin 34 which in turn is rotatably mounted in a bearing 36 on the frame structure 1. The idler wheels 31 and 32 are rotatably mounted on a bolt 38 at the free end of the arm 33 by means of ball bearings 36 and 37, respectively, the idler wheels 31 and 32 being rotatable independently of each other relative to the arm 33. As shown in Fig. 1, the idler wheel 31 is positioned within the loop of the forward drive belt 27, and the idler wheel 32 is located within the loop of the reverse drive belt 29.

A swivel block 39 is pivotally mounted on the idler supporting arm 33 and extends laterally outward therefrom as indicated in Fig. 2. The outwardly extending portion of the swivel block 39 has a diametrical bore for the reception of a cylindrical rod 41 which forms the upper part of an actuating link for the arm 33 which is slidable lengthwise within the swivel block 39. The lower part 42 of the actuating link is connected with the lower end of the rod 41 for adjustment lengthwise of the latter by means of nuts 43 which are threaded on the rod 41 and bear upon upper and lower faces of a slide lug 44 of the lower link part 42. Lengthwise sliding movement of the link part 41 relative to the swivel block 39 is limited by resilient stop means including a coil spring 46 which surrounds the rod part 41 above the swivel block 39, and another coil spring 47 which surrounds the rod part 41 below the swivel block 39.

The lower end of the link part 42 is swingably connected by means of a pivot pin 48 to a rocker 49 which is pivotally mounted on the shaft 13 for back and forth swinging movement between the position in which it is shown in Fig. 1 and the position in which it is shown in Fig. 3. The rocker 49 comprises two arms, one extending radially of the shaft 13 and the other extending generally transversely of the shaft 13 and rigidly connected, as by welding, to the radially extending arm of the rocker. Figs. 1 and 3 show the rocker in different positions of pivotal adjustment about the shaft 13 to which the rocker may be moved by a suitable mechanism, not shown.

Fig. 1 shows the mechanism in a condition of adjustment which places the forward drive belt 27 under tension while the reverse drive belt 29 is slack. In other words, Fig. 1 shows the mechanism in its forward drive establishing position, and in that condition of the mechanism the coil spring 47 is compressed between the swivel block 39 and an abutment nut 45 on a threaded portion of the link part 41. The axial expanding force of the compressed coil spring 47 urges the idler supporting arm 33 upward about the axis of the pivot pin 34, and the idler wheel 31 is thereby urged against the inner side of the belt 27 so as to take up the slack of said belt and maintain it under adequate tension for transmitting the desired amount of power from the driving pulley 18 to the driven pulley 26. The abutment nut 45 may be adjusted lengthwise of the rod part 41 for the purpose of increasing or decreasing the tension of the belt 27 independently of pivotal adjustment of the rocker 49 about the shaft 13.

Fig. 3 shows the mechanism in a condition of adjustment which places the reverse drive belt 29 under tension while the forward drive belt 27 is slack. In other words, Fig. 3 shows the mechanism in its reverse drive establishing condition, and in that condition of the mechanism the coil spring 46 is compressed between the swivel block 39 and a hexagonal head at the upper end of the rod part 41. The axial expanding force of the compressed coil spring 46 urges the idler supporting arm 33 downward about the axis of the pivot pin 34, and the idler wheel 32 is thereby urged against the inner side of the belt 29 so as to take up the slack of the latter and maintain it under adequate tension for transmitting the desired amount of power from the reverse driving pulley 19 to the driven pulley 26. The rod part 41 may be adjusted lengthwise of the lower link part 42 for the purpose of increasing or decreasing the tension of the belt 29 independently of pivotal adjustment of the rocker 49 about the shaft 13.

A pair of auxiliary idlers 51 and 52 are mounted on the frame structure 1 at a fixed center outside of the loops of the belts 27 and 29 and in proximity to the free end of the idler supporting arm 33. A supporting bolt 53 for the idlers 57 and 52 is rigidly secured to the frame structure 1, and the idlers are rotatable independently of each other about the axis of the bolt 53. In the forward drive condition of the mechanism, as shown in Fig. 1, the outer side of the tensioned forward drive transmitting belt 27 bears against the auxiliary idler 51 and the slack reverse drive transmitting belt 29 is supported at its outer side on the auxiliary idler 52. Similarly, in the condition of the mechanism, as shown in Fig. 3, the outer side of the tensioned reverse drive belt 29 bears against the auxiliary idler 52 and the outer side of the slack forward drive belt 27 rides loosely on its associated auxiliary idler 51.

When the rocker 49 and link 41, 42 are moved downward from the forward drive establishing position in which they are shown in Fig. 1, to reverse drive establishing position in which they are shown in Fig. 3, the arm 33 is relieved of the upward thrust to which it is subjected by the spring 47, and the forward drive transmitting belt 27 slackens so that the power transmitting connection between the shafts 13 and 23 becomes interrupted. Continued descent of the rocker 49 and link 41, 42 from their forward drive establishing position brings the head at the upper end of link part 41 into engagement with the upper spring 46 whose lower end is seated on the swivel block 39. The resulting progressive compression of the spring 46 causes gradual engagement of the reverse drive train and establishment of a driving connection between the continuously rotating reverse drive transmitting shaft 8 and the reversibly rotatable driven shaft 23. A similar gradual engagement of the forward drive train is effected by movement of the rocker 49 from the position in which it is shown in Fig. 3 to the position in which it is shown in Fig. 1.

The herein disclosed reversible belt drive and its installation in a rotary baling machine are shown in applicant's copending U.S. patent application, Serial No. 717,503, filed February 25, 1958, for Baling Machine.

For purposes of definition, the two sections of the double groove pulley 26 may be considered as a pair of coaxial sheaves, and the pulleys 18 and 19 as individual sheaves. The coaxial and individual sheaves are mounted by means of the shafts 23, 13 and 8, respectively, on triangularly spaced axes, as shown in Figs. 1 and 3. One of the endless belts 27 and 29 is looped loosely around one of the coaxial and one of the individual sheaves, and the other of the belts is looped loosely around the other of the coaxial and the other of the individual sheaves so that stretches of said belts extend from relatively adjacent sides, respectively, of the individual sheaves 18, 19 toward relatively opposite sides, respectively, of the coaxial sheaves presented by the double groove pulley 26.

In general terms, the improved mechanism for selectively tightening one or the other of the belts 27 and 29 comprises two pairs of coaxial idler pulleys, one of which is represented in the illustrated embodiment of the invention by the pair of coaxial idler wheels 31, 32, and the other being represented by the pair of auxiliary idlers 51, 52. The idler supporting arm 33 and associated parts represent adjustable mounting means rotatably supporting one of said pairs of idler pulleys on a floating axis for transverse back and forth movement between the mentioned belt stretches at one side of the crossover point at which said belt stretches pass each other. The shaft 53 and associated parts represent fixed mounting means rotatably supporting the other of the two pairs of coaxial idler pulleys on a stationary axis between said belt stretches at the other side of said crossover point.

In the illustrated embodiment of the invention the adjustable pair of idler pulleys 31, 32 is supported between the inner surfaces of the mentioned belt stretches, and the fixed pair of idler pulleys 51, 52 is supported between the outer surfaces of said belt stretches.

Back and forth movement of the idler supporting arm 33 about its pivot axis at 34 within relatively short limits is effective to take up a relatively large amount of slack in the belts 27 and 29, respectively. This result is attained by the provision of the stationary idler pulleys 51, 52 which cooperate with the adjustable idler pulleys 31 and 32, respectively, to alternately tighten the belts 27 and 29. The relatively small amount of swing of the arm 33 which is required to take up a relatively large amount of slack of the belts renders the mechanism substantially immune to manufacturing variations of the belts, their inherent stretch under load, and their normal wear. The stationary coaxial mounting of the idler pulleys 51 and 52 not only insures adequate tensioning of the belts but it also involves a minimum of parts and manufacturing costs.

While a preferred embodiment of the invention has been explained herein and in the mentioned copending application, it should be understood that it is not intended to limit the invention to the exact forms and details herein described, and that the invention includes such other forms and modifications as are embraced by the scope of the appended claims.

What is claimed is:

1. A power transmitting mechanism comprising, in combination, a pair of oppositely rotatable drive pulleys operatively mounted at a predetermined radial spacing from each other; a multiple groove driven pulley operatively mounted at predetermined radial spacings, respectively, from said driving pulleys; a forward drive transmitting endless belt arranged to ride in a slack condition on one of said driving pulleys and in a groove of said driven pulley; a reverse drive transmitting endless belt arranged to ride in a slack condition on the other of said driving pulleys and in another groove of said driven pulley; a control arm having a pivot center at one end in fixed relation to the axes of said driving and driven pulleys; a pair of coaxial idler pulleys rotatably mounted on said arm for swinging movement therewith about said pivot center and in cooperable relation to the inner surfaces, respectively, of said belts; actuating means operatively connected with said arm for selectively swinging the latter in opposite directions about said pivot center and thereby urging said idlers alternately into tension establishing engagement with their respective belts, and auxiliary idler means rotatably mounted on an axis in fixed radial relation to the axes of said driving and driven pulleys and outside of the loops of said belts in proximity to the free end of said idler pulley mounting arm so that the outer side of one of said belts will be urged against said auxiliary idler means upon swinging movement of said arm in one direction, and so that the outer side of the other of said belts will be urged against said auxiliary idler means upon swinging movement of said arm in the opposite direction.

2. In a belt drive of the type comprising a pair of coaxial and two individual sheaves rotatably mounted on triangularly spaced axes, respectively, two endless belts, one looped loosely around one of said coaxial and one of said individual sheaves and the other looped loosely around the other of said coaxial and the other of said individual sheaves so that stretches of said belts extend from the relatively adjacent sides, respectively, of said individual sheaves toward relatively opposite sides, respectively, of said coaxial sheaves, and a mechanism for selectively tightening one or the other of said belts, said mechanism comprising two pairs of coaxial idler pulleys; adjustable mounting means rotatably supporting one of said pairs of idler pulleys on a floating axis for transverse back and forth movement between said belt stretches at one side of the crossover point at which said belt stretches pass each other, and fixed mounting means rotatably supporting the other of said pairs of idler pulleys on a stationary axis between said belt stretches at the other side of said crossover point.

3. A belt drive as set forth in claim 2 wherein said one pair of coaxial idler pulleys is supported by said adjustable mounting means between the inner surfaces of said belt stretches, and wherein said other pair of coaxial idler pulleys is supported by said fixed mounting means between the outer surfaces of said belt stretches.

References Cited in the file of this patent

UNITED STATES PATENTS

| | | |
|---|---|---|
| 1,170,611 | Coulbourn | Feb. 8, 1916 |
| 2,445,797 | Moore | July 27, 1948 |
| 2,562,576 | Raney et al. | July 31, 1951 |
| 2,718,154 | Mathson | Sept. 20, 1955 |